United States Patent
Meishner et al.

[11] Patent Number: 6,148,991
[45] Date of Patent: Nov. 21, 2000

[54] STACK TRANSPORTING ROLLER CONVEYOR

[75] Inventors: Henning Meishner, Wernigerode; Carsten Kiprowski, Neustadt-Glewe, both of Germany

[73] Assignee: TOPACK Verpackungstechnik GmbH, Schwarzenbek, Germany

[21] Appl. No.: 09/249,801

[22] Filed: Feb. 16, 1999

[30] Foreign Application Priority Data

Feb. 14, 1998 [DE] Germany ............... 198 06 133

[51] Int. Cl.⁷ .................................................. B65G 13/02
[52] U.S. Cl. .......................................... 198/780; 414/788
[58] Field of Search ........................... 271/146; 414/788; 198/781.02, 780, 416

[56] References Cited

U.S. PATENT DOCUMENTS 3,189,156  6/1965  Hyer et al. ................................. 198/29

FOREIGN PATENT DOCUMENTS

| | | |
|---|---|---|
| 0 149 694 A1 | 7/1985 | European Pat. Off. |
| 0 336 258 A2 | 10/1989 | European Pat. Off. |
| 0 565 456 A1 | 10/1993 | European Pat. Off. |
| 05 65 456 A1 | 10/1993 | European Pat. Off. |
| 21 19 633 | 11/1972 | Germany. |
| 22 64 161 | 9/1973 | Germany. |
| 27 02 724 C2 | 9/1977 | Germany. |
| 195 34 499 A1 | 4/1996 | Germany. |
| 1 428 172 | 3/1976 | United Kingdom. |
| 22 41 931 | 9/1991 | United Kingdom. |

*Primary Examiner*—Kenneth W. Noland
*Attorney, Agent, or Firm*—Venable; George H. Spencer; Robert Kinberg

[57] ABSTRACT

A roller conveyor is designed to advance successive stacks of superimposed sheets of paper or the like against an abutment. The lowermost sheets of the stacks tend to slide relative to the sheets above them, and such tendency is counteracted by constructing the roller conveyor in such a way that its major section, which is spaced apart from the abutment, advances the stacks with a first force and the next-following section thereupon advances the stacks with a greater second force. The conveyor has driven shafts which extend transversely of the direction of advancement of the stacks and are surrounded, with play, by ring-shaped or hollow cylindrical rollers which contact the undersides of lowermost sheets of the stacks.

22 Claims, 8 Drawing Sheets

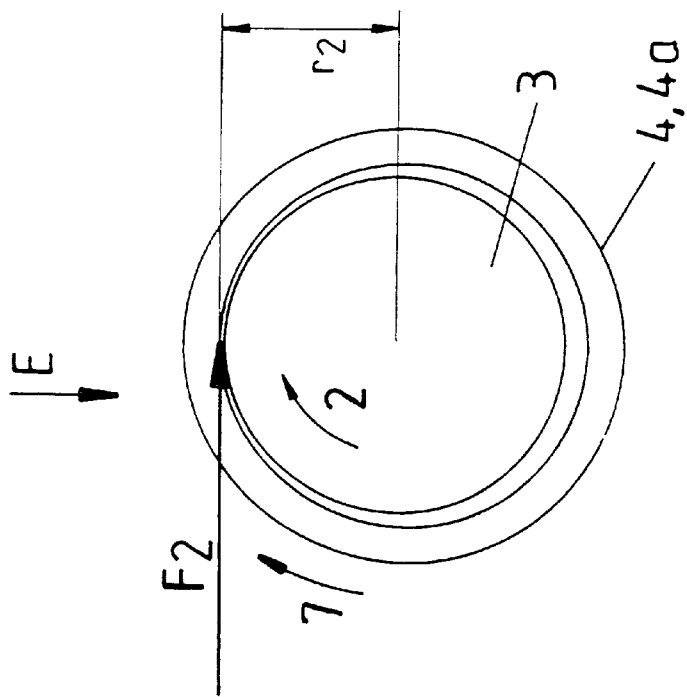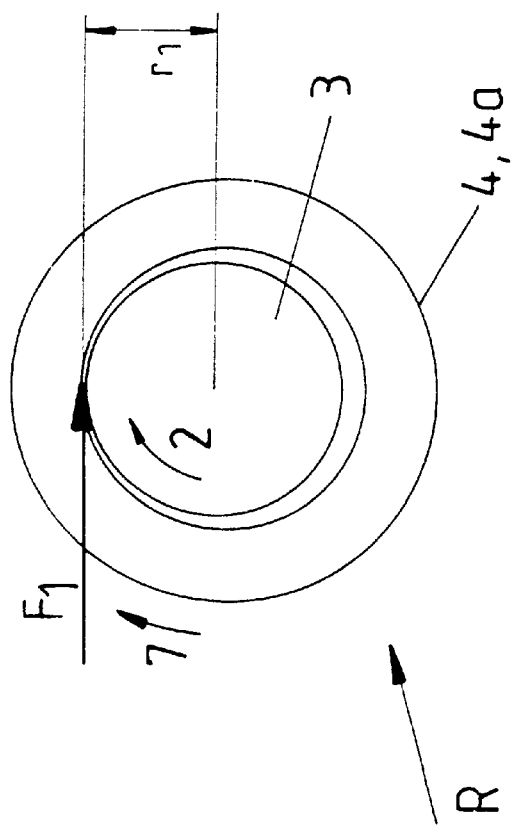
Fig. 6

STACK TRANSPORTING ROLLER CONVEYOR

CROSS-REFERENCE TO RELATED CASES

This application claims the priority of German patent application Serial No. 198 06 133.1 filed Feb. 14, 1998. The disclosure of the German patent application, as well as that of each patent mentioned in the specification of the present application, is incorporated herein by reference.

BACKGROUND OF THE INVENTION

The invention relates to conveyors in general, and more particularly to improvements in conveyors which can be utilized to advance successive stacks of superimposed sheets toward a discharging or evacuating station where the stacks come to a halt as a result of impingement upon a suitable abutment or barrier. The apparatus of the present invention can be utilized with advantage to supply stacks of superimposed paper, cardboard, metallic and/or plastic foil blanks to or to transport such stacks in a packing machine wherein successive arrays of plain or filter cigarettes or other smokers' products are confined in envelopes (converted blanks) to form so-called packets ready to be confined in cartons or other suitable receptacles.

A drawback of presently known roller conveyors for the transport of stacks of superimposed sheets of paper or the like is that the lowermost sheets (and frequently one or more sheets above the lowermost sheets) are likely to become shifted relative to the remaining sheets which are located above the lowermost sheet or sheets during advancement of stacks toward a location where the stacks are to be transferred into or are already located at the singularizing station.

Certain types of roller conveyors employ driven shafts which are disposed below the path for the stacks and are loosely surrounded by annular rollers which do or can receive torque from the respective shafts by friction and transmit motion to the lowermost sheets of the stacks. A shifting of the lowermost sheet(s) of a stack relative to the sheets above the lowermost sheet(s) is attributable, at least in part, to the tendency of leading edges of the sheets to bend or curl downwardly and to thus strike against the peripheral surfaces of the rollers which loosely surround the respective driven shafts. The result is a rearward shifting of the lowermost sheets relative to the sheets above them so that the stacks arriving at and impinging upon the abutment include upper regions or strata with accurately overlapping sheets and lower regions consisting of one or more sheets which lag behind (i.e., which have been shifted relative to) the sheets in the respective upper strata. Otherwise stated, the stacks which come to a halt at the discharge end of the roller conveyor normally include sheets (the upper sheets) which come to a halt in optimum positions for singularization and/or other processing, and one, two or even more lowermost sheets which are shifted relative to and lag behind the bulk of sheets above them. This can cause serious problems during further processing, e.g., when the sheets of the stacks are blanks ready to be converted into envelopes for arrays of plain or filter cigarettes, cigarillos or other smokers' products. The same holds true when the sheets of successive stacks are to be utilized in other fields, e.g., for the confinement of reams of paper sheets, for the confinement of foodstuffs or elsewhere.

OBJECTS OF THE INVENTION

An object of the invention is to provide an arrangement which can prevent or compensate for shifting of certain sheets of stacks of superimposed sheets which are being transported by a conveyor toward an abutment at which all layers or sheets of each of a short or long series of successive stacks should accurately overlie or overlap each other.

Another object of the invention is to provide a novel and improved roller conveyor for the transport of paper sheets or the like toward and against a barrier or abutment.

A further object of the invention is to provide a roller conveyor which can automatically reduce the likelihood of, or prevent, shifting of lowermost sheets of stacks of superimposed sheets relative to the sheets above them.

An additional object of the invention is to provide an adjustable roller conveyor which can be set up to predictably transport stacks of differently dimensioned, configurated and/or textured sheets or layers or panels of paper, cardboard, metallic foil, plastic foil or the like.

Still another object of the invention is to provide a novel and improved method of transporting piles or stacks of overlapping sheet-like commodities, particularly in machines for the processing of smokers' products.

A further object of the invention is to ensure that the original positions of overlapping sheets in successive stacks of sheets remain at least substantially unchanged during transport by a roller conveyor.

Another object of the invention is to provide a novel and improved apparatus for, and a novel and improved method of, transporting blanks in cigarette packing and analogous machines.

An additional object of the invention is to provide novel and improved torque transmitting connections between driven shafts and rolling elements in roller conveyors.

SUMMARY OF THE INVENTION

One feature of the present invention resides in the provision of a conveyor for transporting successive objects of a series of objects in a predetermined direction and along a predetermined path toward an abutment. The improved conveyor comprises a first section which is spaced apart from the abutment and includes means for advancing the objects in the predetermined direction with a first force, and a second section disposed between the first section and the abutment and including means for advancing the objects in the predetermined direction with a second force greater than the first force.

Each section of the improved conveyor comprises at least one driven shaft extending transversely of the predetermined direction and being located beneath the predetermined path, and at least one object-contacting element surrounding each of the shafts and being rotatable relative to the respective shaft.

Each object can comprise or constitute a stack of superimposed sheets including a lowermost sheet contacting the rotary elements during transport along the predetermined path.

The apparatus can further comprise means (e.g., endless belts or chains or sets of mating gears) for transmitting to each of the shafts a constant torque.

The object of setting up the second section of the conveyor in such a way that it advances the objects with a greter second force can be accomplished by utilizing in the first section one or more shafts having a first diameter and by utilizing in the second section one or more shafts having a second diameter larger than the first diameter.

Alternatively the second section of the conveyor can comprise a stop on each of its shafts, and means (such as one or more coil springs and/or other suitable resilient means, or fluid-operated cylinder-and-piston means or the like) for biasing the rotary element or elements on each shaft of the second section toward the respective stop.

In accordance with another embodiment, the coefficient of friction of the peripheral surfaces of rotary elements in the first section of the conveyor can be different from (lower than) the coefficient of friction of the object-contacting peripheral surface(s) of the rotary element(s) forming part of the second section of the conveyor.

The force with which the second section of the conveyor advances the stacks can be selected and varied by providing the second section with an adjustable brake for the rolling element(s) of the second section. The brake can comprise a mobile braking member and means for urging the braking member against the rolling element(s) of the second section with a variable force. The braking member can be provided with a friction generating surface which contacts the rolling element(s) of the second section. For example, the braking member can carry or embody a resilient layer and the friction generating surface can be provided on such resilient layer.

As a rule, or at least in most instances, the predetermined path is or can be at least substantially horizontal, and such conveyor can further comprise means for moving the second section to a plurality of different levels relative to the first section to thus raise or lower each object being borne by the second section and to thereby select the second force.

It is also possible to select the resistance which the lowermost sheet or sheets offers or offer to shifting relative to the sheets above them by providing means for electrostatically charging the stacks in at least one portion of the predetermined path (e.g., in the first section) to thus enhance the adherence of neighboring sheets to each other. Such means for electrostatically charging can be provided in addition to or in lieu of the previously described undertakings.

One of the presently preferred uses of the improved apparatus is to transport stacks of superimposed blanks which are convertible into envelopes for smokers' products, e.g., into envelopes of cigarette packets known as hinged lid packets.

Each rotary element of the conveyor can constitute a hollow cylinder having at least substantially coaxial internal and external cylindrical surfaces. The shafts of such conveyor can have cylindrical external surfaces which are surrounded, with radial play, by the internal surfaces of the respective rotary elements.

Another feature of the invention resides in the provision of a method of conveying successive stacks of superimposed sheets in a predetermined direction and along a predetermined path toward an abutment. The improved method comprises the steps of conveying the stacks with a first force along a first section of the path which is remote from the abutment, and conveying the stacks with a second force, greater than the first force, along a second section of the path between the first section and the abutment.

The step of conveying with the first force can include establishing a first frictional engagement between the lowermost sheets of successive stacks and a series of first driven rollers in the first section of the path, and the step of conveying with the second force can include establishing a more pronounced second frictional engagement between the lowermost sheets of successive stacks and at least one second driven roller in the second section of the path. If the path is at least substantially horizontal, the step of conveying with the second force can include moving the at least one second driven roller between a plurality of different levels.

At least one of the steps can include electrostatically charging the sheets of stacks in the respective section or sections of the predetermined path.

One of the steps can include applying to the rollers in the respective section of the predetermined path a variable braking force which determines the magnitude of the torque being transmitted from the driven shafts to the respective rollers.

The novel features which are considered as being characteristic of the invention are set forth in particular in the appended claims. The improved roller conveyor itself, however, both as to its construction and its mode of operation, together with numerous additional important features and attributes thereof, will be best understood upon perusal of the following detailed description of certain presently preferred specific embodiments with reference to the accompanying drawings.

BRIEF DESCRIPTION OF THE DRAWINGS

FIG. 6 is a fragmentary elevational view of a further roller conveyor which embodies the present invention;

DESCRIPTION OF PREFERRED EMBODIMENTS

Figure 1:
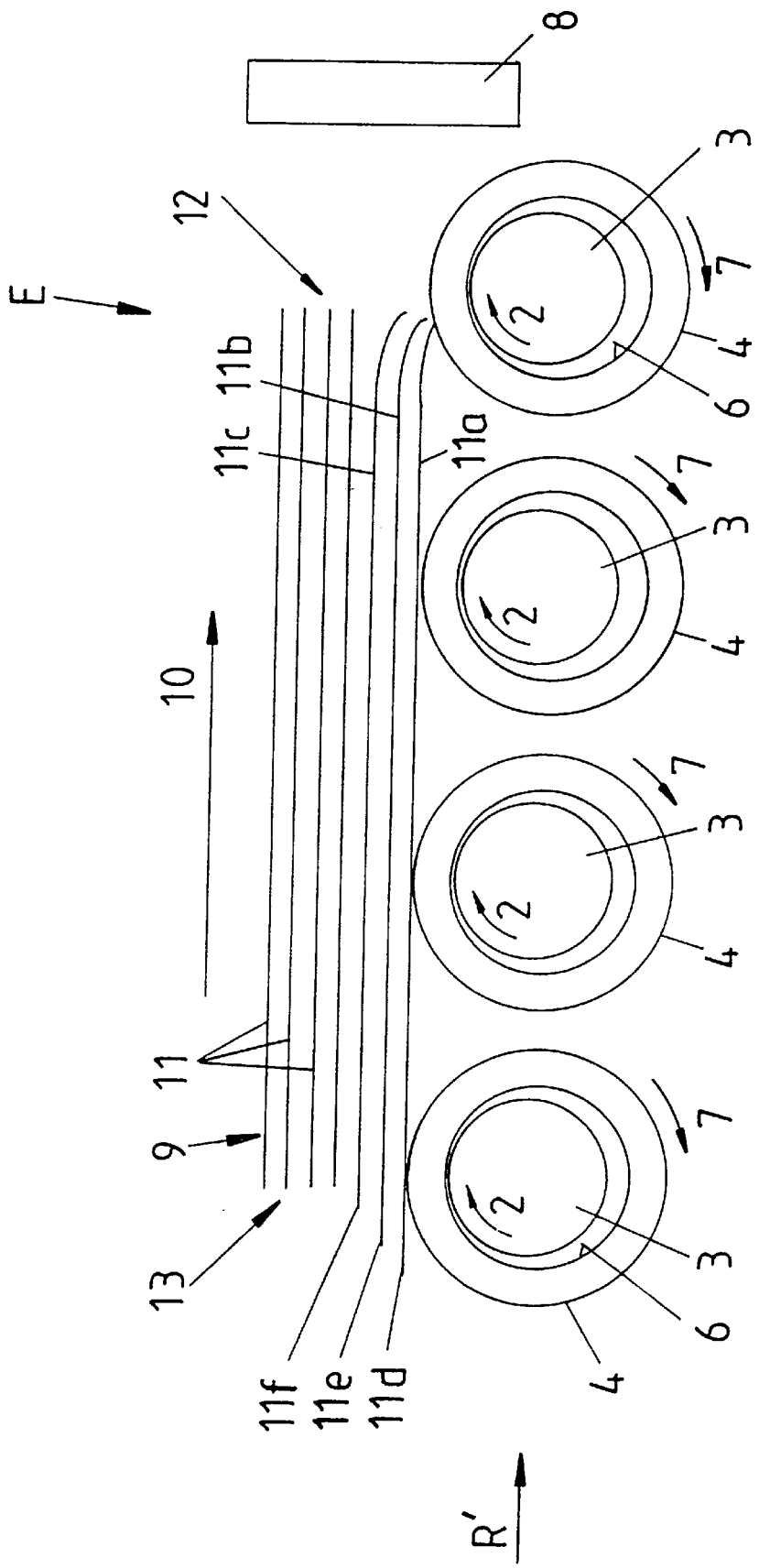
FIG. 1 is a schematic elevational view of a conventional roller conveyor which is shown in the process of advancing a stack of overlapping sheets toward an abutment.

FIG. 1 shows a portion of a roller conveyor R' which comprises a series of identical shafts 3 driven to rotate in directions indicated by arrows 2 and being loosely surrounded (with radial play) by rotary annular rolling elements or rollers 4 having cylindrical internal surfaces 6 frictionally engaged by the cylindrical external surfaces of the respective shafts 3. The directions of rotation of the rollers 4 are indicated by arrows 7. The means for transmitting torque to the shafts 2 preferably includes a suitable prime mover and transmissions (e.g., in the form of belt and pulley transmissions) designed to drive each of the shafts with the same force.

Each shaft 3 can carry a single roller 4 or a series of two or more rollers, depending upon the axial length of the shaft, the axial length of the rollers, and the dimensions of the objects 9 which are being transported by the roller conveyor R'. The illustrated object 9 is a stack or pile of sheets 11 including three lowermost sheets 11a, 11b and 11c having trailing ends 11d, 11e, 11f, respectively. The purpose of the conveyor R' is to transport a series of successive stacks 9 in the direction of arrow 10 (i.e., transversely of the axes of the shafts 3) toward a discharge end E where the stacks are arrested by a stationary abutment 8, e.g., an upright wall. FIG. 1 shows the individual sheets 11 of the stack 9 with pronounced clearances between neighboring sheets; it goes without saying that the neighboring sheets 11 actually contact each other. Furthermore, it is assumed that all sheets 11 of a stack 9 which has been delivered onto or assembled on the conveyor R' accurately overlap or overlie each other.

It has been found that, in actual practice, the leading ends or edges 12 of a majority of superimposed sheets 11 continue to accurately overlie each other all the way during transport (by the rollers 4) toward and into contact with the confronting surface of the abutment 8. However, one or more lowermost sheets (such as the sheets 11a, 11b, 11c) tend to lag behind the sheets above them so that their trailing edges or ends 11d, 11e, 11f often lag behind the trailing ends or edges 13 of the bulk of sheets 11 above the sheet 11c. This can cause problems during singularization of sheets in successive stacks 9 which have reached the abutment 8 and are to be processed for the making of envelopes or other types of wrappers as well as for many other purposes.

In many instances, the conveyor R' is utilized to advance a short or long series of stacks 9 at short intervals so that the second stack comes to a halt as a result of advancement against the stack which already impinges upon the abutment 8, and so forth. Such piling up of several successive stacks on the rollers 4 of the conveyor R' is likely to cause deformation of the trailing ends 11d, 11e, 11f of lowermost sheets in successive stacks, especially if the number of rearwardly shifted lowermost sheets varies from stack to stack.

One of frequent reasons for shifting of one or more lowermost sheets in stacks of originally accurately overlapping sheets is that the leading ends of the lowermost sheets exhibit a tendency to curl or bend downwardly (this is shown in FIG. 1) whereby such downwardly extending leading ends strike against normally cylindrical external or peripheral surfaces of the adjacent rollers 4 and are pushed rearwardly relative to the sheets above them. Other causes of shifting of the lowermost sheets are or can be attributed to inertia, to non-uniform finish of the peripheral surfaces of the rollers 4, to the accumulation of moisture on the peripheral surfaces of the rollers and/or others.

Figure 2:
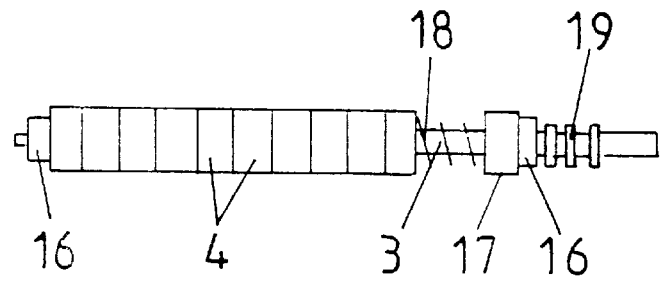
FIG. 2 is an elevational view of a portion of a roller conveyor which embodies one form of the present invention.

FIG. 2 shows a driven shaft 3 and annular rollers 4 forming part of a roller conveyor which embodies one form of the invention. The shaft 3 and the rollers 4 form part of a second or downstream section of a roller conveyor of the type shown in FIG. 1, i.e., if utilized in the conveyor R' of FIG. 1, the parts which are shown in FIG. 2 are installed at the discharge end E adjacent the abutment 8. The improved conveyor can comprise a first section employing assemblies of shafts 3 and rollers 4 identical with or similar to those shown in FIG. 1, and a second or downstream section between the first section and the abutment 8 and employing one, two or more assemblies of shaft 3 and rollers 4 of the type shown in FIG. 2.

The shaft 3 of FIG. 2 carries two clamping rings or stops 16 which are adjacent the two end portions of the shaft and are secured to the latter against axial movement but preferably against axial and angular movements. A cupped receptacle 17 abuts the right-hand stop 16 and receives at least one (end) convolution of a resilient element 18 (shown in the form of a coil spring) which bears against the adjacent roller 4 and biases all of the rollers toward the left-hand stop 16. Thus, the spring 18 reduces the facility with which the rollers 4 can rotate relative to the shaft 3 and thus increases the force which the rollers 4 apply to the adjacent lowermost sheets 11a of successive stacks 9 in the direction of arrow 10, i.e., in a direction to move the stacks 9 toward engagement with the abutment 8 or with the immediately preceding stacks. Such mode of designing the second or downstream section of the roller conveyor not only reduces the likelihood of shifting of one or more lowermost sheets (such as 11a, 11b, 11c) relative to the adjacent (superimposed) sheet but it also enables the improved conveyor to perform a correcting action by actually reducing the extent of previously developed shifting of the lowermost sheet or sheets. The result is that the leading ends of all sheets 11 in a stack 9 actually contact the abutment 8 or the rear side of the immediately preceding stack, or that the extent of rearward shift of the lowermost sheet or sheets is within acceptable limits.

The just described advantages of the improved roller conveyor are achieved by the novel expedient of reducing the facility with which the rollers in the second or downstream section of the conveyor can rotate relative to the respective shafts (or vice versa), or by simply preventing the shafts and the respective rollers from rotating relative to each other. However, it is not always necessary to invariably compel the rollers in the second section of the improved roller conveyor to rotate with the respective shafts, i.e., it is merely necessary to ensure that the entraining force exerted by the rollers upon the lowermost sheets of successive stacks in the second section exceed the entraining force of the rollers in the first or upstream section.

Figure 3:
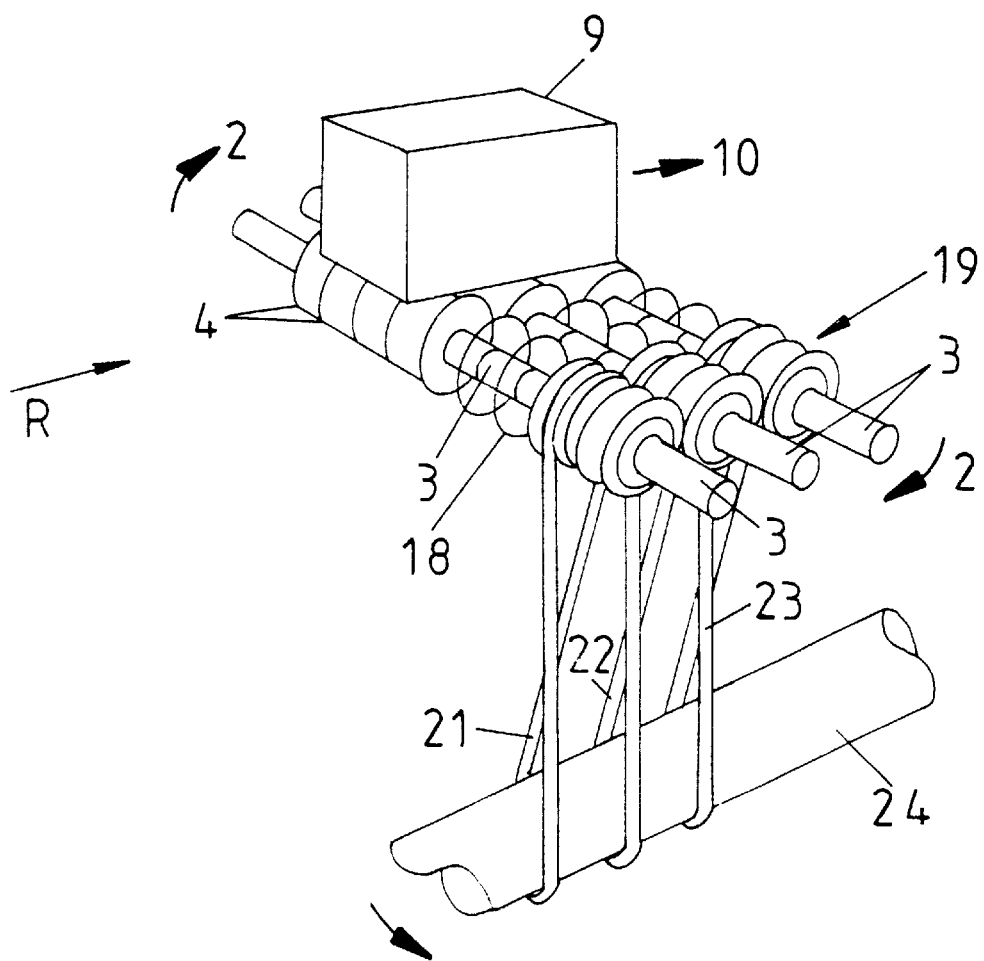
FIG. 3 is a perspective view of a larger portion of a roller conveyor which embodies structures of the type shown in FIG. 2.

FIG. 2 further shows a pulley or sheave 19 forming part of means for applying to the shaft 3 a predetermined torque. As can be seen in FIG. 3, the torque applying means comprises a main drive shaft 24 which drives several endless flexible elements 21, 22, 23 in the form of chains or belts which drive pulleys 19 on three neighboring shafts 3 forming part of the second or downstream section of the improved roller conveyor R. As already mentioned above, the second section of the improved conveyor R can employ a single assembly of the type shown in FIG. 2 or two, three (see FIG. 3) or more such assemblies.

It is clear that the means for driving the shafts 3 in the second section of the improved roller conveyor R can depart from that (including the parts 19 and 21–24) shown in FIG. 3. The clamping rings or stops 16 (which are preferably installed to rotate with the respective shafts 3) and the receptacles 17 are not shown in FIG. 3. The parts 16, 17 and 18 can be omitted if the rollers 4 shown in FIGS. 2 and 3 are non-rotatably secured to or made of one piece with the respective shafts 3.

The roller conveyor R including the structure (second section) of FIG. 3 can be utilized alone or in parallel with one or more additional roller conveyors, depending upon the length of the shafts 3 and/or upon the dimensions or weight of the stacks 9.

It is also possible to omit the springs 18, the stops 16 and the receptacles 17 if the rollers 4 in the second section of the improved conveyor R are provided with external surfaces or outer layers having a coefficient of friction higher than that of the rollers in the first or upstream section of the improved conveyor. Furthermore, the just described novel feature can be resorted to in addition to the features which distinguish the improved conveyor R from the conventional conveyor R'. A higher coefficient of friction can be arrived at by providing the rollers of the second section with outer layers of rubber or the like. This will be fully described hereinafter.

Figure 4:
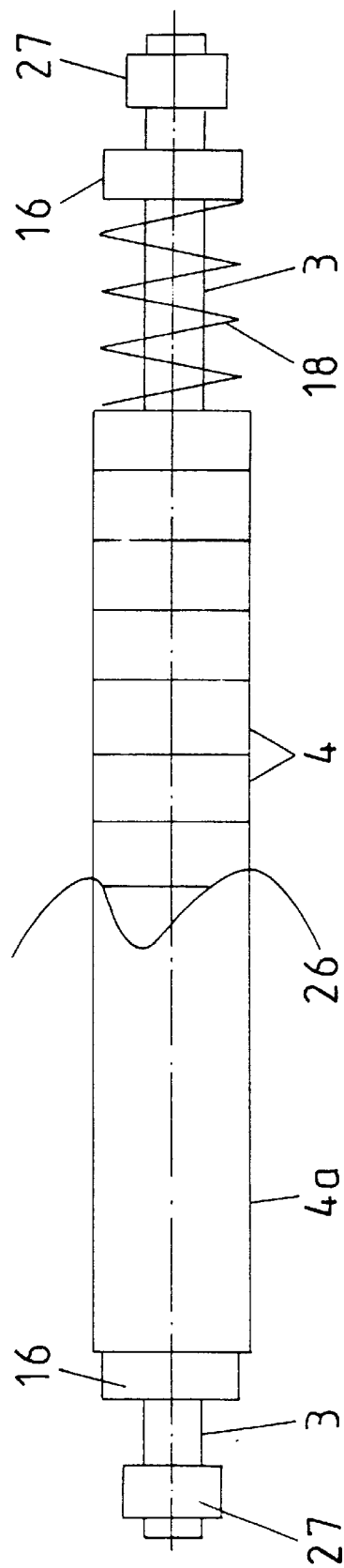
FIG. 4 is an elevational view of a portion of a roller conveyor constituting a first modification of the structure shown in FIG. 2.

FIG. 4 shows that the second section of the improved roller conveyor can employ one or more shafts 3 which carry sets of relatively short annular rollers 4 or a single elongated cylindrical roller 4a. The dividing line 26 indicates that a shaft 3 can carry a single elongated roller 4a, a small number of (e.g., two) such elongated rollers, one or more shorter rollers 4 and one or more longer rollers 4a, or only a set of shorter rollers 4. FIG. 4 further shows bearings 27 for the end portions of the shaft 3.

Figure 5:
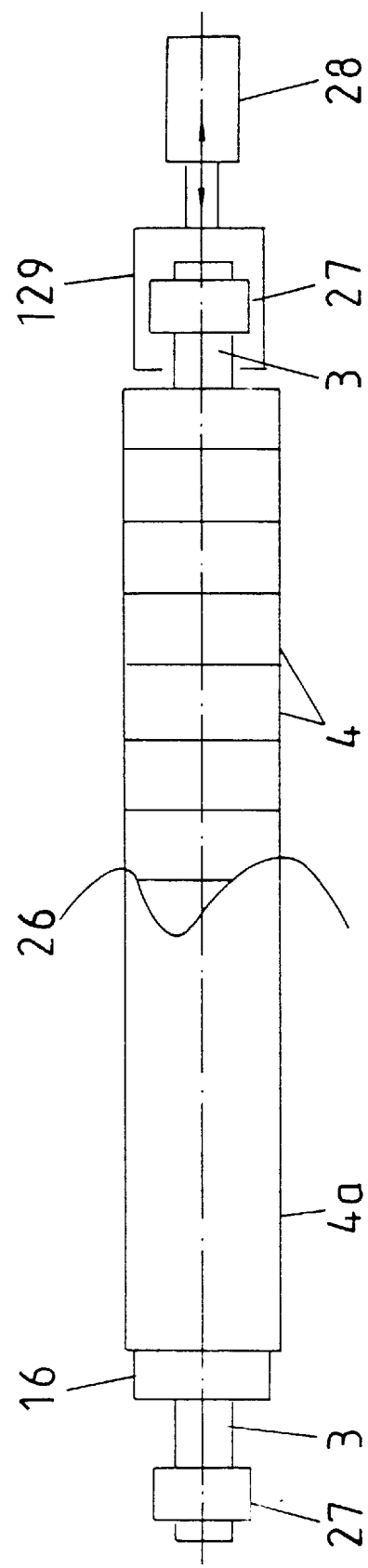
FIG. 5 is an elevational view of a portion of a roller conveyor constituting a second modification of the structure shown in FIG. 2.

FIG. 5 shows a structure which can be utilized in lieu of the structure shown in FIG. 4. The right-hand bearing 27 is received in a housing 129 which is movable longitudinally of the shaft 3 to urge the roller 4a and/or the rollers 4 against the left-hand stop 16 with a variable force which is selectable by an adjustable hydraulic or pneumatic motor in the form of a cylinder-and-piston unit 28. In addition to or in lieu of the features shown in FIG. 5, the roller 4a and/or the rollers 4 of FIG. 5 can be provided with aforementioned friction-enhancing layers or coats or films of rubber or the like. Furthermore, the second section of the improved roller conveyor R can employ one or more shaft-roller assemblies of the type shown in FIGS. 2–3, one or more assemblies of the type shown in FIG. 4 and/or one or more assemblies of the type shown in FIG. 5.

FIG. 6 illustrates another mode of increasing the forces with which the rollers of a roller conveyor can pull the lowermost sheets of stacks of superimposed sheets toward the discharge end of the conveyor. The left-hand portion of FIG. 6 shows a shaft-roller assembly 3, 4 or 3, 4a in the first or upstream section of the conveyor, and the right-hand portion of this Figure shows an assembly in the second or downstream section of the same conveyor. The radius $r_1$ of the cylindrical external surface of the left-hand shaft 3 is only slightly smaller than the radius of the cylindrical internal surface of the surrounding roller 4 or 4a but considerably smaller than the radius of the cylindrical external surface of such roller. On the other hand, the radius $r_2$ of the cylindrical external surface of the right-hand shaft 3 is again only slightly smaller than the radius of the cylindrical internal surface of the respective roller 4 and/or 4a but also only slightly smaller than the radius of the external surface (s) of the respective roller or rollers. The same holds true for the diameters of the just discussed cylindrical surfaces. Such design of the improved roller conveyor R ensures that the force $F_2$ with which the rollers at the discharge end E of the conveyor entrain the lowermost sheets of successive stacks is greater than the force $F_1$ which is applied to the lowermost sheets during advancement of the respective stacks by the upstream or first section of the same conveyor.

The just desscribed features of the roller conveyor R of FIG. 6 can be utilized in combination with the features of one or more conveyors shown in FIGS. 2 to 5.

Figure 7:
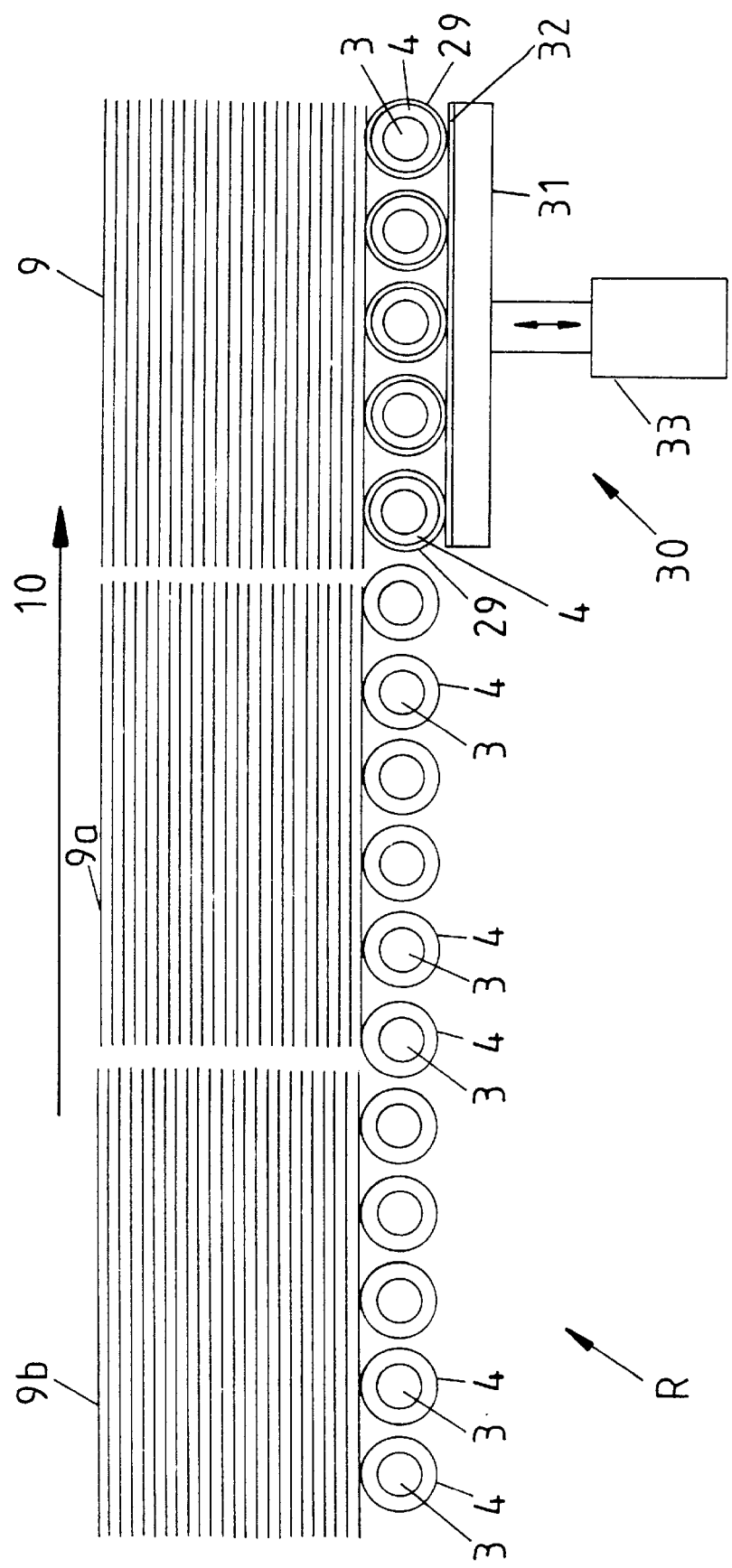
FIG. 7 is a fragmentary elevational view of an additional roller conveyor which embodies the instant invention.

FIG. 7 shows a portion of or an entire roller conveyor R which embodies a further form of the invention. The main or first or upstream section can employ at least eleven shaft-roller assemblies 3, 4 (or 3, 4a or 3, 4, 4a) which can support and advance a plurality of (e.g., two) successive stacks 9a, 9b. The second or downstream section of the conveyor R of FIG. 7 employs at least five shaft-roller assemblies 3, 4 and a braking device or system 30 which can influence the resistance offered by the rollers 4 in the second section to rotation with the respective shafts 3. The second section supports and advances a further stack 9. The stacks 9, 9a, 9b can comprise sheets which constitute blanks consisting of paper, cardboard, metallic foil and/or plastic foil and being convertible into evelopes or wrappers for arrays of plain or filter cigarettes or other smokers' products.

The braking device 30 comprises a horizontal platform 31 having a top layer 32 of rubber or other suitable friction enhancing material, and a hydraulic or pneumatic cylinder-and-piston unit 33 which is actuatable to move the platform 31 up or down and to thus select the forces with which the driven shafts 3 in the second section tend to rotate the respective rollers 4. The cylindrical external surfaces of the rollers 4 in the second section are provided with layers or coats or films 29 of rubber or the like to enhance the frictional engagement with the platform 31 and/or with the lowermost sheets of successive stacks 9, 9a, 9b, etc. The frictional engagement between the layer 32 on the platform 31 of the braking device 30 and the layers 29 of the adjacent rollers 4 can be selected in such a way that the selected desirable rotational speed of the rollers 4 above the platform 31 cannot be influenced by the lowermost layers or sheets of the oncoming stacks 9a, 9b which are being advanced in the direction of the arrow 10.

Figure 8:
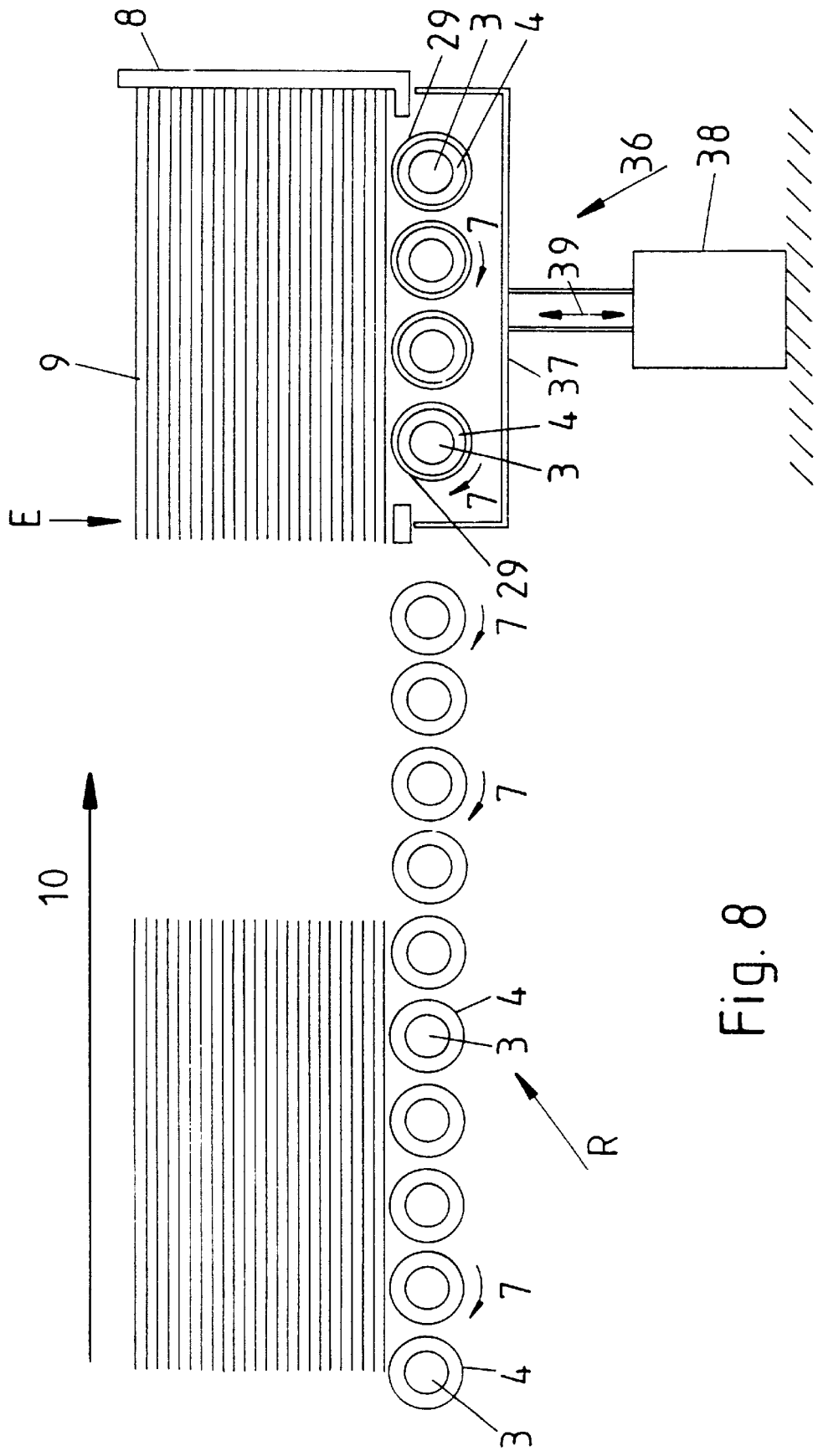
FIG. 8 is a view similar to that of FIG. 7 but showing still another roller conveyor which embodies the present invention.

FIG. 8 shows a roller conveyor R which constitutes a modification of the just described conveyor of FIG. 7. The first or upstream section comprises several assemblies of driven shafts 3 and rollers 4 (and/or 4a), and the second section comprises four shaft-roller assemblies 3, 4 mounted on a lifting or elevating device 36 which can move the entire second section to any one of a plurality of different levels relative to the normally horizontal path portion defined by the first section.

The leading edges of all sheets in the foremost stack 9 contact the confronting surface of the abutment 8. The rollers 4 in the second section of the conveyor R of FIG. 8 have external layers 29 of rubber or the like, and such layers actually contact and transmit forces to the lowermost sheets of the stacks above them.

The lifting or elevating device 36 comprises a hydraulic or pneumatic cylinder-and-piston unit 38 which can be operated in any convenient manner to move the platform 37 up or down as indicated by the double-headed arrow 39. The shafts 3 in the second section of the conveyor R of FIG. 8 share the vertical movements of the platform 37; this enables the outer layers of the rollers 4 in the second section to exert upon the overlying sheets a force which is necessary to shift the lowermost sheet or sheets until such sheet or sheets come into contact with the abutment 8.

The rollers 4 of the second section can be non-rotatably connected to the respective shafts 3, i.e., to those shafts which are carried by the platform 37 of the lifting or elevating device 36. The platform 37 can constitute the bottom wall of an open-top housing which mounts the respective shafts 3 and is installed at the discharge end E of the roller conveyor R shown in FIG. 8.

Figure 9:
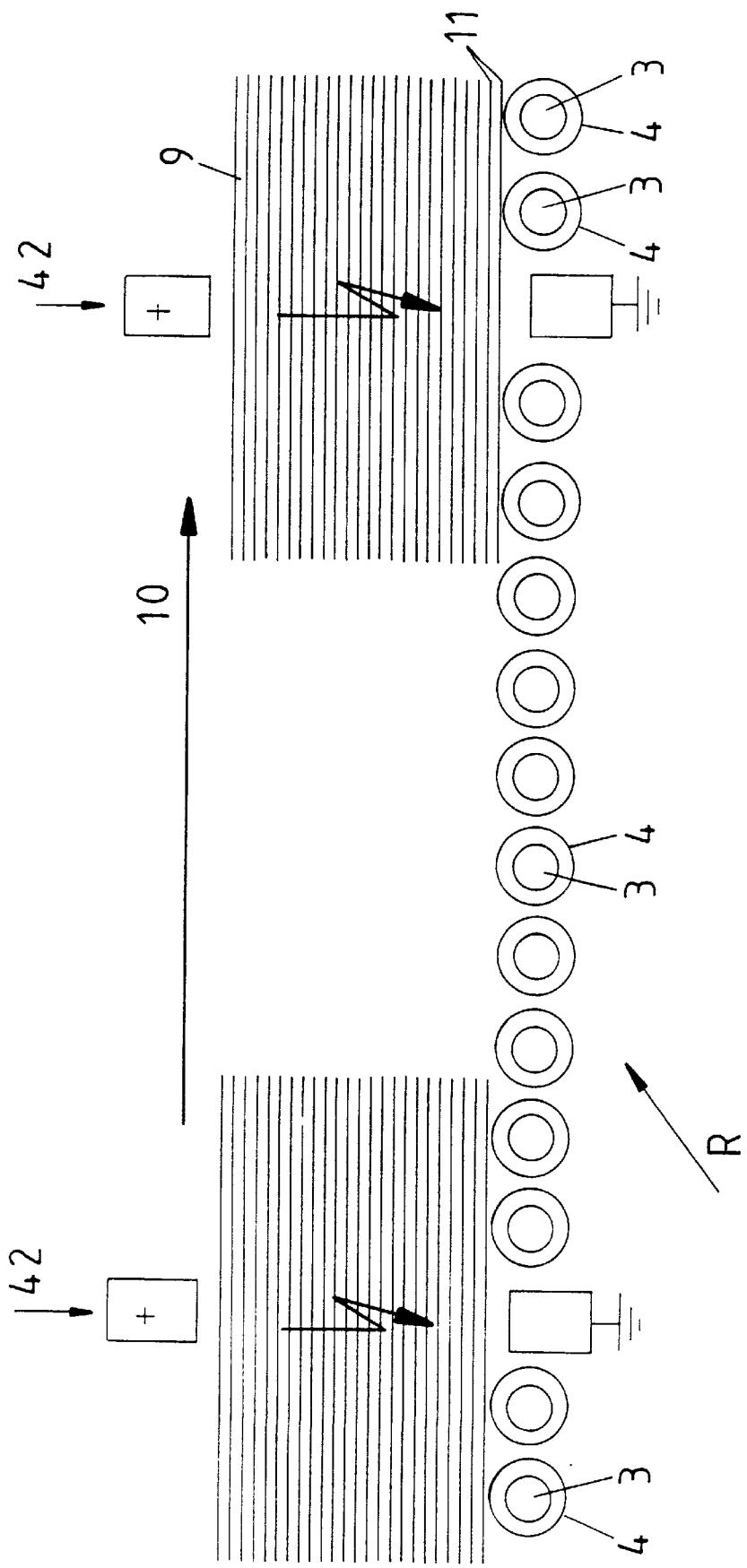
FIG. 9 is a view similar to that of FIG. 7 or 8 but showing a further roller conveyor which embodies the present invention.

FIG. 9 shows a portion of a further roller conveyor R which employs one or more loading stations 42 for the application of positive electrostatic charges to the adjacent stacks 9 while the stacks advance in the direction of the arrow 10 toward the abutment (not shown in FIG. 9). The thus applied electrostatic charges ensure that the sheets or layers of the stacks 9 are less likely to slide or shift relative to each other, i.e., such electrostatic charges reduce the tendency of the lowermost sheets to slide rearwardly relative to the sheets above them and/or the tendency of the upper sheets to slide forwardly relative to the sheets below them.

The electrostatic charges can be reduced or eliminated when the stacks 9 reach the discharge end of the conveyor R of FIG. 9.

Electrostatic charging and charge removing systems which can be utilized in or with the conveyor R of FIG. 9 are distributed by the Firm HAUG GmbH KG, Friedrich-Liszt-Strasse 18, D-70771 Leinfelden-Echter-dingen (near Stuttgart), Federal Republic Germany. Suitable systems being distributed by HAUG are known as HAUG Tristat TR 25.

The important advantages of the improved apparatus incude its simplicity and versatility. Thus, the conversion of a standard roller conveyor into an embodiment of the improved roller conveyor can be carried out in a very simple, time-saving and inexpensive manner, e.g., by non-rotatably securing the roller or rollers in the second section of a standard conveyor to the respective shaft or shafts, by providing a braking device, by increasing the diameter(s) of the driven shaft(s) in the second section and/or by resorting to the expedient which was described with reference to FIG. 9.

Furthermore, the improved roller conveyor can be set up to reduce the likelihood of shifting of the lowermost sheet or sheets relative to the sheets above such lowermost sheet or sheets, and/or to change the position(s) of the lowermost sheet(s) relative to the sheets above the lowermost sheet or sheets.

Without further analysis, the foregoing will so fully reveal the gist of the present invention that others can, by applying current knowledge, readily adapt it for various applications without omitting features that, from the standpoint of prior art, fairly constitute esential characteristics of the generic and specific aspects of the above outlined contribution to the art of roller conveyors and, therefore, such adaptations should and are intended to be comprehended within the meaning and range of equivalence of the appended claims.

What is claimed is:

1. A conveyor for transporting successive objects of a series of objects in a predetermined direction and along a predetermined path toward an abutment, comprising:
   a first section spaced apart from said abutment and including means for advancing the objects in said direction with a first force; and
   a second section disposed between said first section and said abutment and including means for advancing the objects in said direction with a second force greater than said first force.

2. The conveyor of claim 1, wherein each of said sections comprises at least one driven shaft extending transversely of said direction and located beneath said path, and at least one rotary object-contacting element surrounding each of said shafts and being rotatable relative to the respective shaft.

3. The conveyor of claim 2, wherein each object comprises a stack of superimposed sheets including a lowermost sheet contacting said rotary elements during transport along said path.

4. The conveyor of claim 2, further comprising means for transmitting to each of said shafts a constant torque.

5. The conveyor of claim 2, wherein each shaft of said first section has a first diameter and each shaft of said second section has a second diameter larger than said first diameter.

6. The conveyor of claim 2, wherein each shaft of said second section is elongated and said second section further comprises a stop on each elongated shaft and means for biasing the at least one rotary element on each elongated shaft longitudinally of the respective shaft and toward the respective stop.

7. The conveyor of claim 6, wherein said biasing means comprises resilient means.

8. The conveyor of claim 6, wherein said biasing means comprises fluid-operated means for urging the at least one rotary element on each elongated shaft toward the respective stop.

9. The conveyor of claim 2, wherein each rotary element of said first section has an object-contacting peripheral surface with a first coefficient of friction, and each rotary element of said second section has an object-contacting peripheral surface with a second coefficient of friction higher than said first coefficient.

10. The conveyor of claim 2, wherein said second section further comprises an adjustable brake for each rolling element of the second section.

11. The conveyor of claim 10, wherein said brake comprises a mobile braking member and means for urging said braking member against each rolling element of said second section with a variable force.

12. The conveyor of claim 11, wherein said braking member has a friction generating surface contacting each rolling element of said second section.

13. The conveyor of claim 12, wherein said braking member has a resilient layer and said friction generating surface is provided on said layer.

14. The conveyor of claim 2, wherein said path is at least substantially horizontal and further comprising means for moving said second section to a plurality of different levels relative to said first section to thus raise or lower each object being borne by the second section.

15. The conveyor of claim 2, wherein each object includes a stack of superimposed neighboring sheets, and further comprising means for electrostatically sharging the stacks in at least one portion of said path to thus enhance the adherence of neighboring sheets to each other.

16. The conveyor of claim 2, wherein the objects comprise stacks of superimposed blanks convertible into envelopes for smokers' products.

17. The conveyor of claim 2, wherein each rotary element is a hollow cylinder having at least substantially coaxial internal and external cylindrical surfaces.

18. The conveyor of claim 17, wherein said shafts have cylindrical external surfaces surrounded with radial play by the internal surfaces of the respective rotary elements.

19. A method of conveying successive stacks of superimposed sheets in a predetermined direction and along a predetermined path toward an abutment, comprising the steps of:
   conveying the stacks with a first force along a first section of said path remote from the abutment; and
   conveying the stacks with a second force, greater than the first force, along a second section of said path between the first section and the abutment.

20. The method of claim 19, wherein said step of conveying with said first force includes establishing a first frictional engagement between the lowermost sheets of successive stacks and a series of first driven rollers in said first section of said path, said step of conveying with said second force including establishing a more pronounced second frictional engagement between the lowermost sheets of successive stacks and at least one second driven roller in said second section of said path.

21. The method of claim 20, wherein said path is at least substantially horizontal and said step of conveying with said second force includes moving the at least one second driven roller between a plurality of different levels.

22. The method of claim 19, wherein one of said conveying steps includes electrostatically charging the sheets of stacks in the respective section of said path.

* * * * *